V. G. APPLE.
CENTRIFUGAL SPEED GOVERNOR.
APPLICATION FILED SEPT. 28, 1914.
1,145,656.  Patented July 6, 1915.
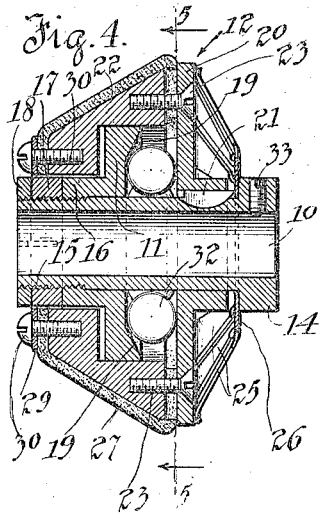
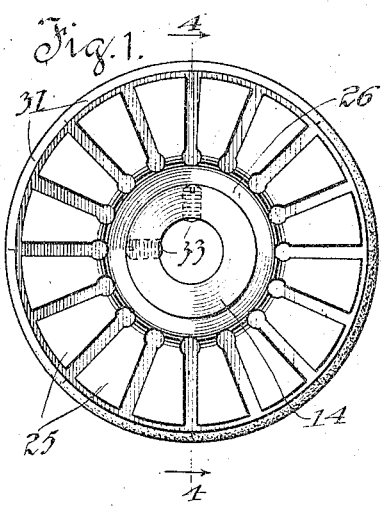
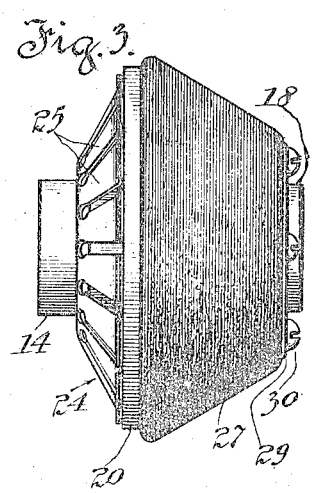
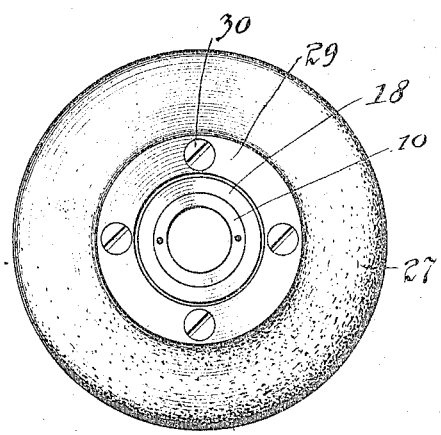
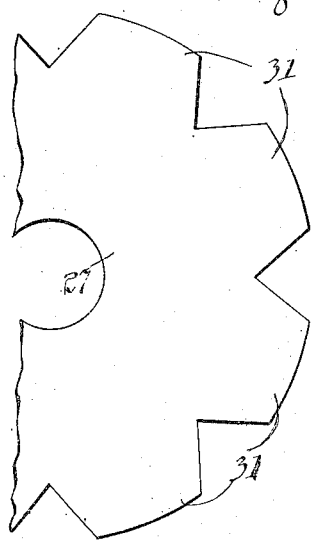
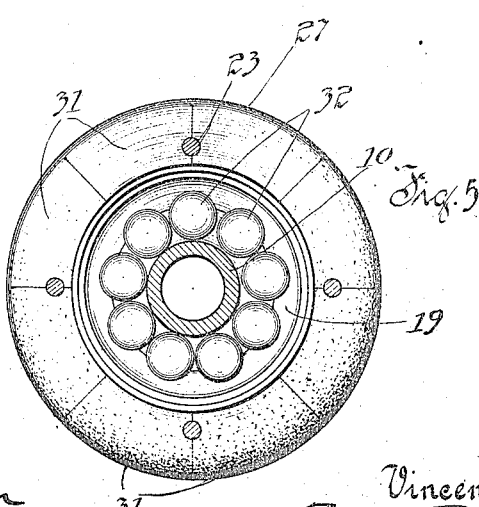
Witnesses
Arthur W. Carlson
Robert H. Weir
Inventor
Vincent G. Apple,
Force Bain May
Attys.

UNITED STATES PATENT OFFICE.

VINCENT G. APPLE, OF DAYTON, OHIO, ASSIGNOR TO THE APPLE ELECTRIC COMPANY, OF DAYTON, OHIO, A CORPORATION OF OHIO.

CENTRIFUGAL SPEED-GOVERNOR.

1,145,656.

Specification of Letters Patent.

Patented July 6, 1915.

Application filed September 28, 1914. Serial No. 863,856.

*To all whom it may concern:*

Be it known that I, VINCENT G. APPLE, a citizen of the United States, residing at Dayton, in the county of Montgomery and State of Ohio, have invented certain new and useful Improvements in Centrifugal Speed-Governors, of which the following is a specification.

My invention relates to improvements in centrifugal speed governors.

One of the general objects of my invention is to provide a governor, which is responsive to slight changes of speed, whereby to maintain substantially constant the rate of speed of a rotating shaft controlled thereby.

Another and more specific object of my invention is to provide a more sensitive structure; one that is cheaper to produce and more durable and to generally improve the shape, character and relation of the parts.

Other and further objects of my invention will become readily apparent, to persons skilled in the art, from a consideration of the following description when taken in conjunction with the drawings, wherein—

Figure 1 is an end elevation of the governor. Fig. 2 is an end elevation of the governor, looking at the opposite end. Fig. 3 is a side elevation. Fig. 4 is a central, longitudinal section taken on line 4—4 of Fig. 1. Fig. 5 is a transverse section taken on line 5—5 of Fig. 4. Fig. 6 is the pattern of the friction producing covering, or leather for the tapered surface of the pulley. Fig. 7 is a key to hold the driven elements to the sleeve, that is to be attached to the shaft.

In all the views the same reference characters are employed to indicate similar parts.

The device contains two major elements, a sleeve 10 having attached thereto a disk 11 which forms one wall for the annular chamber containing the ball weights, and the pulley portion 12, which is slidable upon the sleeve. The sleeve 10 is provided with a head 14, at one end, and is screw threaded, as at 15, at the other end. The disk 11, preferably, is provided with a sleeve portion 16, screw threaded onto the end of the sleeve 10, and secured thereon by nut 17 and check nut 18. The disk 11 is provided near its periphery, with a laterally oblique surface 19, the disk becoming thicker near its periphery, the object and use of which will be hereinafter more fully explained. The pulley 12 consists of a disk portion 20, having an integral sleeve or hub which is longitudinally slidable upon the sleeve 10 and a conical portion 22 secured to the disk portion, as by screws 33, and which freely slides over the nuts 17 and 18 and on the sleeve 16. Rotation of the pulley independently of the sleeve 10 is prevented by the key 21 which engages the slotted hub of disk 20. A spring member 24 is cup shaped and consists of a series of fingers 25 radiating from a central perforate hub portion 26. The fingers bear upon the outer surface of the disk 20 and the hub portion overlies the sleeve 10 and bears against the head 14 thereof, the effect of the spring being to hold the parts in the relative positions shown in Fig. 4.

A conical portion 22, of the pulley 12, is covered with a yielding, friction producing material, such as leather 27, the pattern for which is shown as a fragment, in Fig. 6. The leather 27 is cut in the shape of a notched disk as shown and formed up into a cup-shape such as shown in Fig. 4, so that it will fit neatly over the tapered cone 22. After the friction leather 27 has been pressed into cup-shape, in a suitable mold and under pressure, it is applied to the conical part 22 of the pulley and the flat ring 29 is placed thereover and held in place by screws 30 that take into the smaller part of the cone 22 of the pulley. The peripheral wings 31 of the leather 27 are folded down over the larger edge of the conical pulley 22, as shown in Fig. 5, and they are held in place by the screws 23 which pass through the disk 22 and the leather 27 into the larger portion of the conical pulley 22. A series of balls, preferably hardened steel balls 32, are placed in the chamber provided between the disks 11 and 12. In the particular exemplification there are nine such balls, as clearly shown in Fig. 5. A key 21 secures the disk 20 to the sleeve 10.

The operation of the governor is as follows:—The sleeve 10 is placed on a shaft, the speed of which is to be controlled and the set screws 33 are set down into the shaft so as to secure the sleeve 10 thereon. The pulley 12 is now placed in juxtaposition with a driving pulley so that the leather surface 27 is in contact therewith in order that the governor pulley will make frictional contact with the driving pulley to rotate the shaft to be controlled. The centrifugal effect produced by the rotation of the pulley will cause the balls 32 to fly out tangentially, to a circumferential plane of rotation, at which time they will press against the tapered lateral projection 19 of the disk 11 and being in contact with the disk 20 will cause the latter to be pushed to the right, against the action of the spring 24, thereby causing the leather surface 27 to be withdrawn from contact, or partially withdrawn from contact with the driving pulley, decreasing the frictional engagement between said pulleys and causing the speed of the shaft, to which the sleeve 10 is attached, to be rotated at a lower velocity, or decreased rate. Should the speed of the shaft tend to decrease below the predetermined velocity, the spring 24 will push the laterally movable pulley 12 again into contact with the driving pulley. The rate at which the governor shaft will be rotated under a given speed of the driving element is determined by the relation of the balls 32 and the spring 24.

In the present exemplification there is no means present for adjusting the effect of the spring 24, but such means could be easily applied if desired. In many devices the speed at which the shaft should be driven is determined in the factory and it is highly desirable that that rate shall not be changed when the device is in the hands of an inexperienced user and for that cause alone the absence of means for adjusting the relation of the centrifugally responsive balls 32 and the spring is desirable.

While I have herein shown and described a single embodiment of my invention for the purpose of clear disclosure it is manifest that changes may be made in the form and relation of the parts within the scope of the appended claims.

Having described my invention, what I claim is:—

1. A self contained, speed responsive governor, comprising a sleeve; a disk secured thereto; another disk spaced apart from the first disk axially movable on said sleeve, but rotatable therewith, one or both said disks having confronting, laterally projecting, circumferentially contiguous tapered surfaces, approaching each other near their periphery; a pulley part, secured to the latter disk and closing the annular space between said disks; a spring tending to yieldingly hold said disks together and a series of balls within said annular space.

2. A self contained, speed responsive governor, comprising a sleeve; a disk secured thereto; another disk spaced apart from the fixed disk, axially movable on said sleeve but rotatable therewith, one or both said disks having confronting, laterally projecting, circumferentially contiguous tapered surfaces; a pulley part; having a tapered frictional driving surface, secured to the latter disk and closing the annular space between said disks; a spring comprising a conically arranged series of fingers bearing on the axially movable disk near its periphery, perforated near its center and overlying said sleeve, tending to yieldingly hold said disks together and a series of balls within said annular space.

3. A speed responsive governor, comprising a part laterally fixed; a driving pulley part, laterally movable with respect to the fixed part; and centrifugally responsive means positioned within the axial confines of said pulley part for laterally separating said parts.

4. A speed responsive governor comprising a part laterally fixed; a driving pulley part laterally movable with respect to the fixed part and spaced apart therefrom to provide an annular chamber; centrifugally responsive means for laterally separating said parts, within said chamber; a spring to resist said centrifugal operating part, the pulley part and a friction producing material overlying said fixed part covering the face of said pulley part.

5. A pulley adapted to be frictionally driven and moved into or out of engagement with its driving member by means of speed responsive mechanism, comprising a base member, rings adapted to be clamped against each end thereof, and a covering composed of a disk of leather secured near its center to one end of the pulley by one of said rings and similarly secured at its periphery to the other end of the pulley.

6. A pulley adapted to be frictionally driven, comprising a base member, a covering comprising a disk of leather and means for securing the same near its center and periphery to opposite ends of the base member.

In testimony whereof I hereunto set my hand in the presence of two subscribing witnesses.

VINCENT G. APPLE.

In the presence of—
  E. V. MARTIN,
  E. KRAUTTER.